United States Patent
Shingai et al.

(10) Patent No.: US 11,760,417 B2
(45) Date of Patent: Sep. 19, 2023

(54) PARKING ASSIST SYSTEM AND VEHICLE WITH AUTOMATED PARKING CAPABILITY

(71) Applicant: HONDA MOTOR CO., LTD., Tokyo (JP)

(72) Inventors: Yuhei Shingai, Wako (JP); Yuki Nakada, Wako (JP); Masaaki Kawano, Wako (JP); Yasushi Shoda, Wako (JP); Daisuke Hanzawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 17/118,717

(22) Filed: Dec. 11, 2020

(65) Prior Publication Data
US 2021/0179174 A1 Jun. 17, 2021

(30) Foreign Application Priority Data
Dec. 13, 2019 (JP) .................. 2019-225952

(51) Int. Cl.
*B60W 10/18* (2012.01)
*B62D 15/02* (2006.01)
(Continued)

(52) U.S. Cl.
CPC ........ *B62D 15/0285* (2013.01); *B60T 17/221* (2013.01); *B60W 10/18* (2013.01); *B60W 10/20* (2013.01); *B60W 30/06* (2013.01)

(58) Field of Classification Search
CPC .. B62D 15/0285; B60T 17/221; B60W 10/18; B60W 10/20; B60W 30/06
See application file for complete search history.

(56) References Cited

U.S. PATENT DOCUMENTS

2003/0033071 A1* 2/2003 Kawasaki ............... F16H 59/66
701/80
2003/0062228 A1* 4/2003 Ichinose ............... B60T 13/741
188/72.3
(Continued)

FOREIGN PATENT DOCUMENTS

JP 2008-094117 A 4/2008
JP 5834058 B2 12/2015
(Continued)

OTHER PUBLICATIONS

Office Action received in corresponding Japanese application No. 2019-225952 dated Jul. 27, 2021 with English translation(6 pages).

*Primary Examiner* — Vivek D Koppikar
*Assistant Examiner* — Jeffrey R Chalhoub
(74) *Attorney, Agent, or Firm* — Rankin, Hill & Clark LLP

(57) ABSTRACT

A brake noise at stationary steering is prevented while brake hold being in operation, in automated steering with parking assist control. An automated-parking control unit includes: an environment recognizer to recognize environment of a vehicle; a behavior controller to execute behavior control inclusive of steering and acceleration/deceleration, based on recognized information; a brake hold instructor to suspend the vehicle with the behavior control and hold the vehicle suspended until receiving behavior-related operation by a driver; an automated-parking controller to set a reverse-steering position, based on a current position of the vehicle and a desired parking position decided by the driver, between the current position and the desired parking position, move the vehicle from the current position to the reverse-steering position, and execute stationary steering at the reverse-steering position; and a brake fluid pressure (Continued)

controller to increase a brake fluid pressure when stationary steering is executed at the reverse-steering position.

6 Claims, 11 Drawing Sheets

(51) Int. Cl.
*B60W 30/06* (2006.01)
*B60T 17/22* (2006.01)
*B60W 10/20* (2006.01)

(56) References Cited

U.S. PATENT DOCUMENTS

2017/0259812 A1* 9/2017 Tomozawa ........... B62D 15/028
2019/0241163 A1 8/2019 Sakaguchi et al.

FOREIGN PATENT DOCUMENTS

| JP | 2019-156393 A | | 9/2019 |
| KR | 20060016691 A | * | 2/2006 |
| WO | 2018047496 A1 | | 3/2018 |

* cited by examiner

PARKING ASSIST SYSTEM AND VEHICLE WITH AUTOMATED PARKING CAPABILITY

CROSS-REFERENCE TO RELATED APPLICATION

This application claims the benefit of priority to Japanese Patent Application No. 2019-225952 filed on 13 Dec. 2019, the disclosures of all of which are hereby incorporated by reference in their entireties.

TECHNICAL FIELD

The present invention relates to a parking assist system and a vehicle with automated parking capability.

BACKGROUND OF THE INVENTION

Japanese Patent Application Publication No. 2008-094117 (hereinafter, referred to as Patent Document 1) discloses a vehicular braking force control device capable of reducing a steering force required for stationary steering, while suitably holding a vehicle suspended.

Japanese Patent No. 5834058 (hereinafter, referred to as Patent Document 2) discloses a parking assist ECU to execute parking assist control capable of recognizing environment of a vehicle by a camera and then guiding the vehicle to a desired parking position.

SUMMARY OF THE INVENTION

Problems to be Solved

However, the vehicular braking force control device of Patent Document 1 is made to reduce a steering force in braking force reduction control, and accordingly has not taken noisemaking in consideration when a vehicle is braked (brake noise). That is, a brake pad is pressed against a disk by oil pressure, when a vehicle is braked. At this time, a brake noise may be made, depending on balance between a frictional force generated by the brake pad and a driving force. A brake noise is made when the brake pad is separated off the disk after being pressed against the disk. This brake noise brings uncomfortable feeling or discomfort to a driver.

Particularly in automated steering with parking assist control of Patent Document 2, a brake noise may be made at stationary steering (steering with a vehicle in a suspended condition) after the vehicle is suspended (while brakes being on hold) at a predetermined position. In this case, a driver may sense a brake noise sensitively more than normal because automated steering is being executed. All the more in a case where the vehicle is an EV (Electric Vehicle), which is superior in quietness, or the like, a brake noise at stationary steering notably brings uncomfortable feeling or discomfort to a driver.

The present invention has been made in view of above-identified problems and is intended to provide a parking assist system and a vehicle with automated parking capability to prevent a brake noise at stationary steering, while brakes being on hold, in automated steering by the parking assist system.

Solution to Problem

A parking assist system of the present invention is capable of solving the above-identified problems, and includes: an environment recognizer to recognize environment of a vehicle; a behavior controller to execute behavior control inclusive of steering and acceleration/deceleration, based on recognized information; a suspension hold controller to suspend the vehicle with the behavior control and hold the vehicle suspended until receiving behavior-related operation by a driver; an automated-parking controller to set a reverse steering position, based on a current position of the vehicle and a desired parking position decided by the driver, between the current position and the desired parking position, move from the current position to the reverse steering position, and execute stationary steering at the reverse steering position; and a brake fluid pressure controller to increase a braking force of the vehicle when stationary steering is executed at the reverse steering position.

Advantageous Effects of the Invention

According to the present invention, a brake noise at stationary steering, while brake hold being in operation, is prevented in automated steering with parking assist control.

EMBODIMENTS OF THE INVENTION

Figure 1:
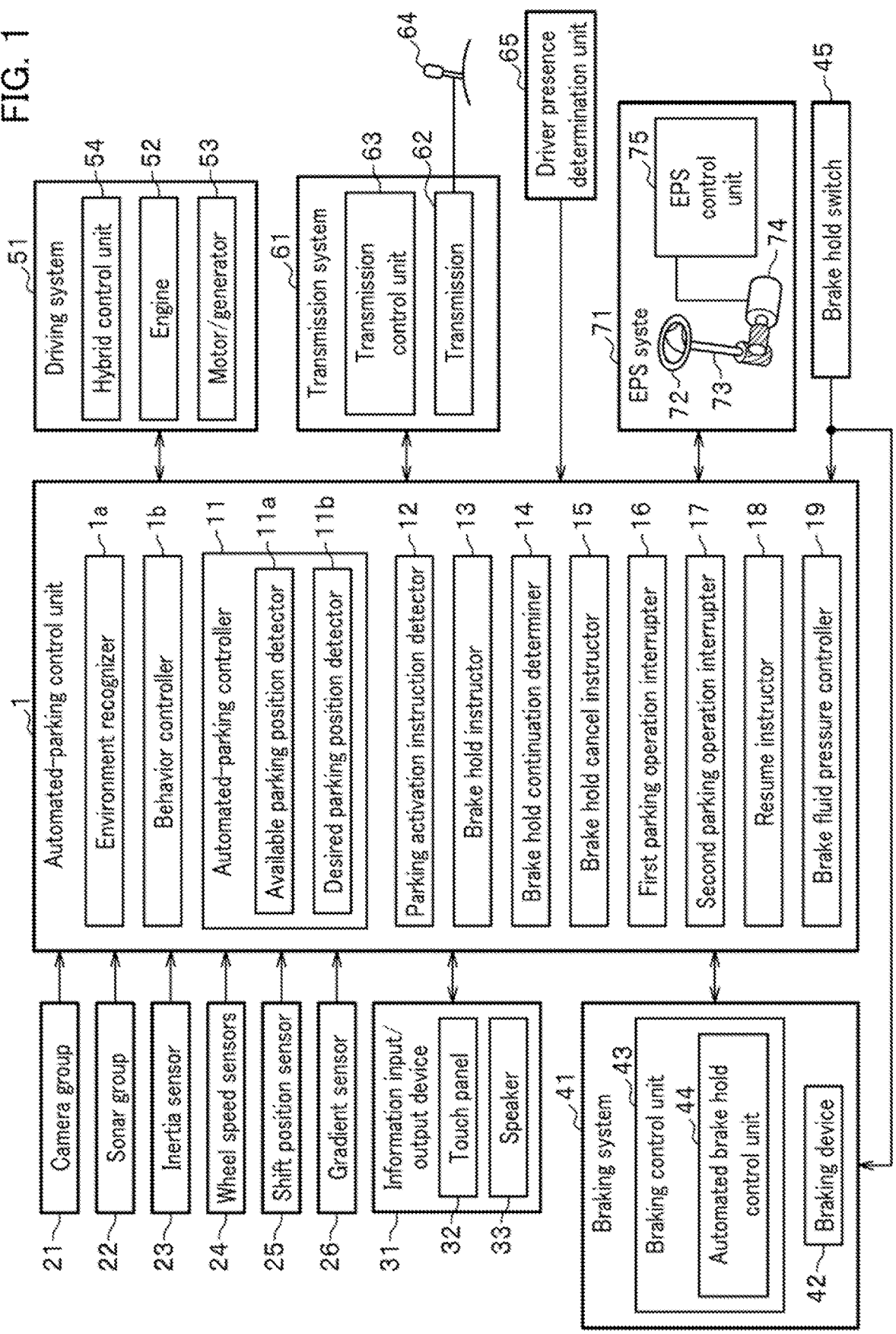
FIG. 1 is a block diagram of a system configuration, centered around an automated-parking control unit according to an embodiment of the present invention.
Figure 2:
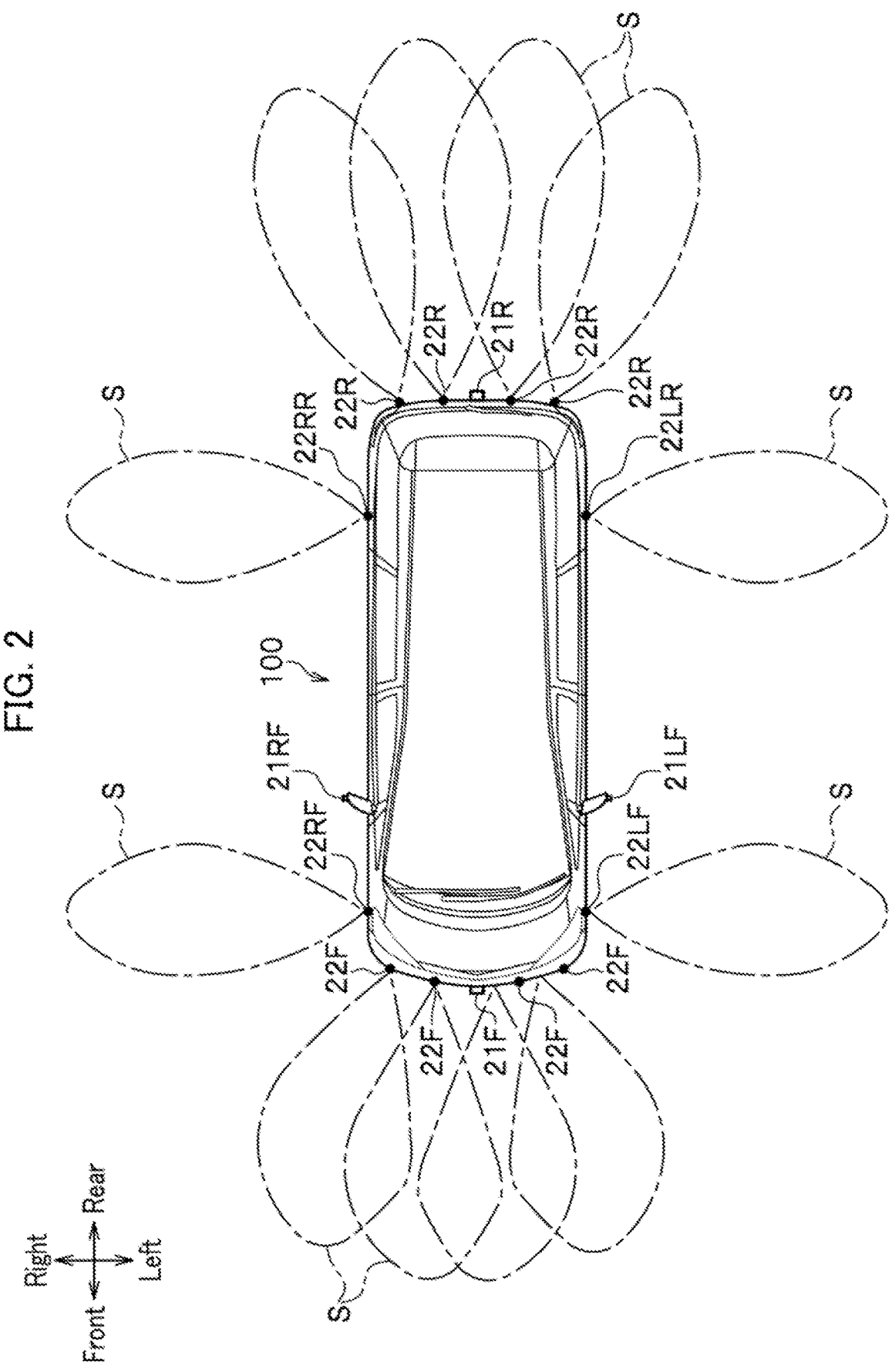
FIG. 2 is a top view of a vehicle mounted with the automated-parking control unit according to the embodiment of the present invention, to show mounting positions of cameras and sonars.

Hereinafter, an embodiment of the present invention is described with reference to drawings. Directions of front, rear, right, and left are indicated in the drawings by arrows. FIG. 1 is a block diagram of a system configuration of the present embodiment, centered around an automated-parking control unit 1. FIG. 2 is a top view of a vehicle 100 mounted with the system in FIG. 1.

The automated-parking control unit 1 is an automated-parking ECU (Electronic Control Unit) to implement a parking assist system of the present invention. The automated-parking control unit 1 is configured to be centered around a microcomputer to implement functions of various controllers as follows, through processing executed by control programs of the controllers. That is, the automated-parking control unit 1 executes functions of a behavior controller 1b and an automated-parking controller 11 (a suspension hold controller). The automated-parking controller 11 executes functions of an available parking position detector 11a and a desired parking position detector 11b. In addition, the automated-parking control unit 1 executes functions of a parking activation instruction detector 12, a brake hold instructor 13, and a brake hold continuation determiner 14. Further, the automated-parking control unit 1 executes functions of a brake hold cancel instructor 15, a first parking operation interrupter 16, a second parking operation interrupter 17, a resume instructor 18, and a brake fluid pressure controller 19. Details of processing executed by these components are described below.

The automated-parking control unit 1 has a camera group 21 and a sonar group 22 connected thereto. Note that the components connected to the automated-parking control unit 1 (connection is indicated by mapping lines) may be connected to the automated-parking control unit 1, either directly or via CAN (Controller Area Network).

The camera group 21 includes cameras mounted on the vehicle 100 in FIG. 2. That is, the vehicle 100 is provided with a front camera 21F arranged at a front of the vehicle 100 to image objects in front of the vehicle 100. Likewise, the vehicle 100 is provided with a rear camera 21R arranged at a rear of the vehicle 100 to image objects posterior to the vehicle 100. Additionally, the vehicle 100 is provided with a side camera 21RF arranged at a right front of the vehicle 100 to image objects on the right side of the vehicle 100. Likewise, the vehicle 100 is provided with a side camera 21LF arranged at a left front of the vehicle 100 to image objects on the left side of the vehicle 100. Note that the side cameras 21RF and 21LF may be desirably arranged at front ends of door mirrors or off from the door mirrors to avoid the door mirrors from being imaged excessively large. Of course, the side cameras may be arranged at other positions away from the door mirrors to some extent.

The sonar group 22 includes sonars mounted on the vehicle 100 in FIG. 2. That is, the vehicle 100 is provided with four front sonars 22F aligned at the front of the vehicle 100 substantially at equal intervals. The four front sonars 22F detect obstacles in front of the vehicle 100. In addition, the vehicle 100 is provided with four rear sonars 22R aligned at the rear of the vehicle 100 substantially at equal intervals. The four rear sonars 22R detect obstacles posterior to the vehicle 100. The front sonars 22F and rear sonars 22R detect obstacles in moving directions, forward and rearward, respectively.

The vehicle 100 is further provided with a side sonar 22RF at a right-front lateral side of the vehicle 100. The side sonar 22RF detects obstacles in a field between a right-front direction and a right lateral direction from the vehicle 100. Likewise, the vehicle 100 is provided with a side sonar 22LF at a left-front lateral side of the vehicle 100. The side sonar 22RF detects obstacles in a field between a left-front direction and a left lateral direction from the vehicle 100. Additionally, the vehicle 100 is provided with a side sonar 22RR at a right-rear lateral side of the vehicle 100. The side sonar 22RR detects obstacles in a field between a right-rear direction and a right lateral direction from the vehicle 100. Likewise, the vehicle 100 is provided with a side sonar 22LR at a left-rear lateral side of the vehicle 100. The side sonar 22LR detects obstacles in a field between a left-rear direction and a left lateral direction from the vehicle 100. The side sonars 22RF, 22LF, 22RR, 22LR detect obstacles which may possibly be hit by the vehicle 100. Dashed lines S in FIG. 2 each indicate a spatial range where the corresponding sonar can detect obstacles. Note that the number, and installation positions, of cameras and sonars as described above are not limited to those described, and the cameras and/or sonars may be increased or decreased in number, and/or installed at different positions. However, the number, and installation positions, of cameras and sonars are desirably selected as much as possible so as to detect conditions all around the vehicle 100. Alternatively, sensors other than the cameras and sonars may be used to detect conditions external to the vehicle 100.

Back to FIG. 1, the automated-parking control unit 1 has an inertia sensor 23, wheel speed sensors 24, a shift position sensor 25, and a gradient sensor 26 (road surface gradient detector) connected thereto. The inertial sensor 23 detects acceleration of the vehicle 100. The wheel speed sensors 24 detect wheel speeds of wheels of the vehicle 100. The shift position sensor 25 detects a shift position of a transmitter mounted on the vehicle 100. The gradient sensor 26 detects a gradient of a road surface as a gradient of a road surface on which the vehicle is located. The gradient sensor 26 has a gyroscope and uses an angular speed detected by the gyroscope to calculate an angle in a vertical direction between a pitch direction and a horizontal surface, so as to be detected as a gradient of a road surface. The sensors 21 to 25 of a sensor group are all configured to communicate with the automated-parking control unit 1 via a vehicle network.

In addition, the automated-parking control unit 1 has an information input/output device 31 connected thereto. The information input/output device 31 includes a touch panel 32 and a speaker 33. A main body of the information input/output device is arranged in the vicinity of a driver seat so that a driver can operate the touch panel 32 and the like. The information input/output device 31 displays various information on the touch panel 32, outputs various kinds of sound from the speaker 33, and receives various kinds of operation through the touch panel 32.

In other words, the information input/output device 31 can display automotive navigation information, produced based on a satellite positioning system or the like, and outputs sound from the speaker 33. The information may include information received from a vehicle information and communication system (VICS).

The information input/output device 31 may also receive television broadcasting and/or sound broadcasting to display images on the touch panel 32 and output sound from the speaker 33. The information input/output device 31 may also include an optical disk device (not shown) to play a CD (Compact Disk), a DVD (Digital Video or Versatile Disk), a BD (Blu-ray Disc), or the like. The information input/output device 31 may also include an HDD (Hard Disk Drive), not shown, to play sound such as music stored therein. The information input/output device 31 may further inform various messages from the vehicle 100 or equipment mounted thereon, such as an ETC (Electronic Toll Collection system), and receive various kinds of operation on the touch panel 32 from the vehicle 100 and/or equipment mounted thereon.

The automated-parking control unit 1 has a braking system 41 connected thereto. The braking system 41 is a system to brake the vehicle 100. The braking system 41 includes a braking device 42 to brake the vehicle 100, and a braking control unit 43 to control the braking device 42. The braking control unit 43 includes a function as an automated brake hold control unit 44. The automated brake hold control unit 44 works as an automated brake hold controller. The braking device 42 generates fluid pressure (oil pressure) and supplies the fluid pressure to wheel cylinders of wheels, not shown, to produce frictional braking forces. Note that the braking system 41 may utilize regenerative brakes in combination in a case where the vehicle 100 is a hybrid vehicle or the like. The braking device 42 is a device applied with a brake-by-wire system, for example. Accordingly, the braking device 42 is capable of generating a braking force, regardless of operation on a brake pedal (not shown). Alternatively, the braking device 42 may be a system mounted with an electric brake booster. Even in this case, the braking device 42 is capable of generating a braking force, regardless of operation on a brake pedal (not shown). The braking control unit 43 is a control device to control the braking device 42.

The automated brake hold control unit 44 is a feature included in the braking control unit 43, to control an automated brake hold function to hold a braking state even when a driver has stepped on a brake pedal (not shown) and then has stepped off the brake pedal. Note that the automated brake hold function cancels an automated brake hold state when a predetermined condition is satisfied, such as operation on an acceleration pedal (not shown). The automated brake hold state is activated or canceled through operation of a brake hold switch 45 arranged in the vicinity of a driver seat within the vehicle 100.

The automated-parking control unit 1 has a driving system 51 connected thereto. The driving system 51 is a system to cause the vehicle 100 to travel. The vehicle 100 is a hybrid vehicle in the present example and includes an engine 52 and a motor/generator 53 as driving sources. A hybrid control unit 54 controls the engine 52 and the motor/generator 53 to cause the vehicle 100 to travel. Note that the vehicle 100 is not limited to a hybrid vehicle. Only the engine 52 is used as a driving source for a gasoline vehicle. Only a motor is used as a driving source for an electric vehicle inclusive of a fuel cell vehicle.

A transmission system 61 is a system to shift gears of the vehicle 100. The transmission system 61 includes a transmission 62 to shift gears of the vehicle 100, a transmission control unit 63 to control the transmission 62, and a shift lever 64 connected with the transmission 62. The transmission 62 may be an automatic transmission or a manual transmission. The transmission system is capable of shifting gears by the transmission 62, without operation by a driver, through control by the transmission control unit 63. In this case, the transmission control unit 63 changes a position of the shift lever 64, depending on the shifting. The automated-parking control unit 1 has a driver presence determination unit 65 connected thereto. The driver presence determination unit 65 determines whether or not a driver is seated in a driver seat.

The automated-parking control unit 1 has an EPS (Electric Power-Steering) system 71 connected thereto. The EPS system 71 is a system to assist steering by a driver. The EPS system 71 includes a steering shaft 73 mounted with a steering wheel 72, a driving motor 74 to rotationally drive the steering shaft 73, and an EPS control unit 75 to control the driving motor 74. The EPS system 71 causes the steering shaft 73 to be rotated by the driving motor 74 as a driving source, to assist the driver turning the steering wheel 72 for steering.

The automated-parking control unit 1 includes an environment recognizer 1a to recognize environment of a vehicle, and a behavior controller 1b to execute behavior control inclusive of steering and acceleration/deceleration, based on recognized information, as shown in FIG. 1. The environment recognizer 1a recognizes conditions such as positions of surrounding vehicles, speed, and acceleration, based on information inputted from the camera group 21, the sonar group 22, and the like. The surrounding vehicles are vehicles traveling around the vehicle in question and heading in the same direction as the vehicle in question. The environment recognizer 1a may also recognize positions of other objects, such as a guard rail, a utility pole, a parked vehicle, and a pedestrian, in addition to the surrounding vehicles.

The behavior controller 1b suspends the vehicle 100 with behavior control, and holds the suspension until receiving behavior-related operation by the driver.

The automated-parking controller 11 (suspension hold controller) suspends the vehicle with behavior control by the behavior controller 1b, and holds the suspension until receiving behavior-related operation by the driver.

Based on a current position of the vehicle 100 and a desired parking position decided by the driver, the automated-parking controller 11 sets a reverse steering position 222 (see FIGS. 10 and 13) between the current position and the desired parking position, moves from the current position to the reverse steering position 222, and executes stationary steering at the reverse steering position 222.

The brake fluid pressure controller 19 increases a braking force of the vehicle 100 (e.g., increases a brake fluid pressure) when stationary steering is executed at the reverse steering position 222, while automated-parking control is executed by the automated-parking controller 11. The brake fluid pressure is desired to be such a high brake fluid pressure that wheels are inhibited from being rotated by reaction forces from the road surface caused by the stationary steering.

The brake fluid pressure controller 19 executes brake fluid pressure control to increase a brake fluid pressure from a predetermined pressure to a desired brake fluid pressure, and the desired brake fluid pressure is varied depending on a steering speed and/or a steering angle at the stationary steering.

The brake fluid pressure controller 19 varies a brake fluid pressure based on a gradient of a course of movement. When the gradient is of a downhill, for example, the brake fluid pressure controller 19 increases a brake fluid pressure, as compared with a case where the gradient is of a flat ground.

The brake fluid pressure controller 19 executes brake fluid pressure control to increase a brake fluid pressure from the predetermined pressure to the desired brake fluid pressure, where the desired brake fluid pressure is set to one with a brand-new brake pad as standards.

The automated-parking controller 11 shifts a position in a shift range of the transmission mounted on the vehicle 100 from a D-range to an R-range at the reverse steering position 222, based on shift position data from the shift position sensor 25.

When braking operation is canceled by the driver, the automated-parking controller 11 starts moving to the desired parking position.

The vehicle 100 is provided with the gradient sensor 26 to detect a gradient of a road surface on which the vehicle 100 is located, and the brake fluid pressure controller 19 varies a brake fluid pressure, based on a gradient of a course of movement detected by the gradient sensor 26. Here, when the gradient is of a downhill, the brake fluid pressure controller 19 increases the brake fluid pressure, as compared with a case where the gradient is of a flat ground.

The vehicle 100 (see FIG. 1) is provided with a disk brake 300 to press brake pads 311, 312 (see FIG. 3) against a disk 320 by way of oil pressure to brake the vehicle 100. The brake fluid pressure controller 19 executes brake fluid pressure control to increase a brake fluid pressure from a constant pressure (predetermined pressure) to the desired brake fluid pressure. The desired brake fluid pressure may be set to one with a brand-new brake pad as standards.

Figure 3:
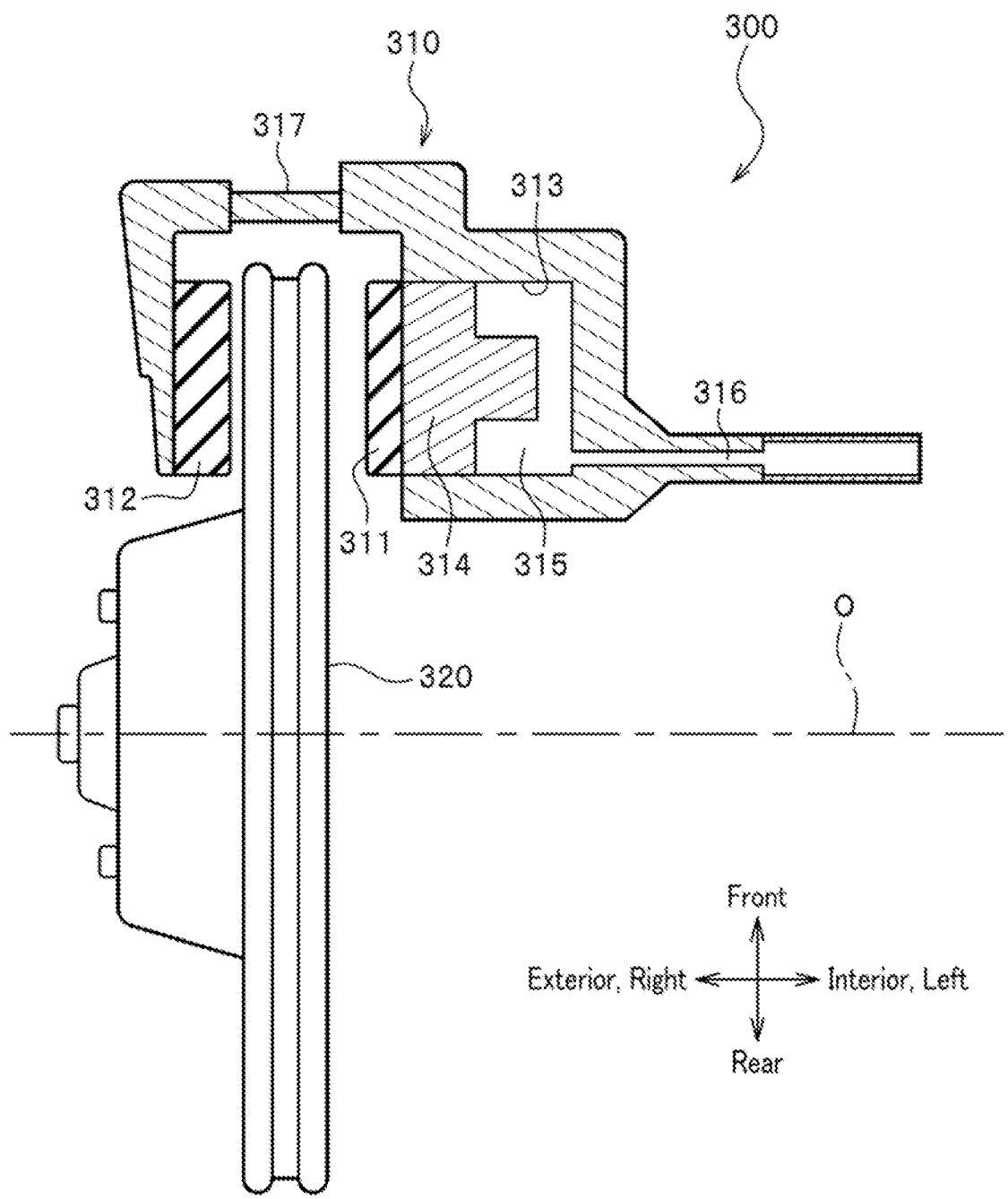
FIG. 3 shows a disk brake of the vehicle mounted with the automated-parking control unit according to the embodiment of the present invention.

FIG. 3 shows the disk brake 300 for the vehicle 100. As shown in FIG. 3, the disk brake 300 stops the disk 320 in a disk shape from being rotated together with a wheel, not shown, to brake the vehicle. Hereinbelow, an orientation of a central axis of the disk 320 is referred to as an orientation of a rotation axis O. The disk brake 300 includes: a caliper 310 slidable in a parallel direction parallel to the rotation axis of the wheel with reference to a vehicle body, between an initial position and an operational position; a first brake pad 311 facing one surface of the disk 320 to be rotated together with the wheel; a second brake pad 312 facing the other surface of the disk 320 and supported by the caliper 310 via a bridge 317 so as to be relatively movable in the parallel direction; and an oil pressure cylinder 313 supported by the caliper 310 and supporting the first brake pad 311, and moving the caliper 310, which has been positioned at the initial position by a reaction force received from the disk 320 via the first brake pad 311 when a driving force has been generated to move the first brake pad 311 so as to contact the disk 320, to the operational position to cause the second brake pad 312 to contact the disk 320.

The first brake pad 311 is an inner friction pad disposed on an inner side, inner in a vehicle width direction than the disk 320. The second brake pad 312 is an outer friction pad disposed on an outer side, outer in the vehicle width direction than the disk 320.

The oil pressure cylinder 313 is positioned on an interior side of the vehicle with respect to the disk 320. The oil pressure cylinder 313 specifically includes a cylinder 313 fixed to the caliper 310 and having an axis line in parallel to the rotation axis O, and a piston 314 partially positioned within the cylinder 313 and slidable with respect to the cylinder 313. The piston 314 supports the first brake pad 311 at a front end thereof. The cylinder 313 is formed therein with a communication hole 316 to communicate a fluid pressure chamber 315 with outside, and brake fluid is introduced into the fluid pressure chamber 315 through the communication hole 316. The brake fluid introduced into the fluid pressure chamber 315 causes the piston 314 to proceed toward the disk 320.

When a driver of the vehicle steps on the brake pedal, oil pressure increases in the oil pressure cylinder 313 to move the piston 314 of the oil pressure cylinder 313 toward the disk 320 so that the first brake pad 311 is pressed against a side surface on the interior side of the disk 320.

The disk 320 is unable to be moved in the rotation axis direction, relative to the vehicle body. Accordingly, when the first brake pad 311 is pressed against the disk 320, the first brake pad 311 receives a reaction force from the disk 320, to cause the caliper 310 at the initial position to be relatively slid, with respect to the vehicle body, toward the interior side so as to be moved to the operational position. Then, the second brake pad 312 supported by the caliper 310 is pressed against a side surface on an exterior side of the disk 320. As a result, a braking force (friction resistance force) is exerted to the disk 320 from the second brake pad 312 and the first brake pad 311, to decrease a rotation speed of the disk 320.

On the contrary, when the driver steps off the brake pedal, the oil pressure in the oil pressure cylinder 313 is reduced to cause the piston 314 to return to the initial position. That is, the oil pressure cylinder 313 comes close to the disk 320, and the caliper 310 at the operational position is moved to the initial position. Accordingly, the second brake pad 312 is separated from the disk 320, and the first brake pad 311 is separated from the disk 320 toward the interior side, with the piston 314 moving to the initial position.

<Brake Noise>

When the vehicle 100 is braked, the brake pads 311, 312 are pressed by oil pressure against the disk 320. At this time, the caliper 310 may be vibrated, depending on such as conditions of the brake pads 311, 312 and a condition of the disk 320, to make an abnormal noise, that is, a brake noise. When braking is gradually canceled, for example, an abnormal noise (brake noise) may be made, depending on a balance between a frictional force generated by the brake pads 311, 312 and a driving force. As shown in FIG. 3, such a noise can be made when the brake pads 311, 312 are separated from the disk 320 after being pressed against the disk 320.

In a case of a manual-mode driving where a driver can adjust a canceling speed of braking with a stepping force on the brake pedal, an experienced driver can reduce an abnormal noise by adjusting a stepping force. However, in a case where braking is automatically canceled, an abnormal noise is desirably prevented by control of the vehicle itself.

Especially, when a stationary steering (steering with a vehicle in a suspended condition) is operated with automated steering by the parking assist system after the vehicle has been suspended (with the brake on hold) at a predetermined position, if a brake noise is made, the driver is more sensitive to the brake noise for a reason of automated steering. All the more in a case where the vehicle is an EV (Electric Vehicle), which is superior in quietness, or the like, a brake noise at stationary steering notably brings uncomfortable feeling or discomfort to a driver.

In the present embodiment, when a stationary steering is executed at the reverse steering position 222, at the time of automated-parking control by the automated-parking controller 11, a brake fluid pressure of the vehicle 100 is increased to press the brake pads 311, 312 against the disk 320 more strongly to inhibit the disk 320 from being rotated by a reaction force from the road surface at stationary steering, so that the brake pads 311, 312 are prevented from making brake noises.

<Automated-Parking Operation>

Figure 4A:
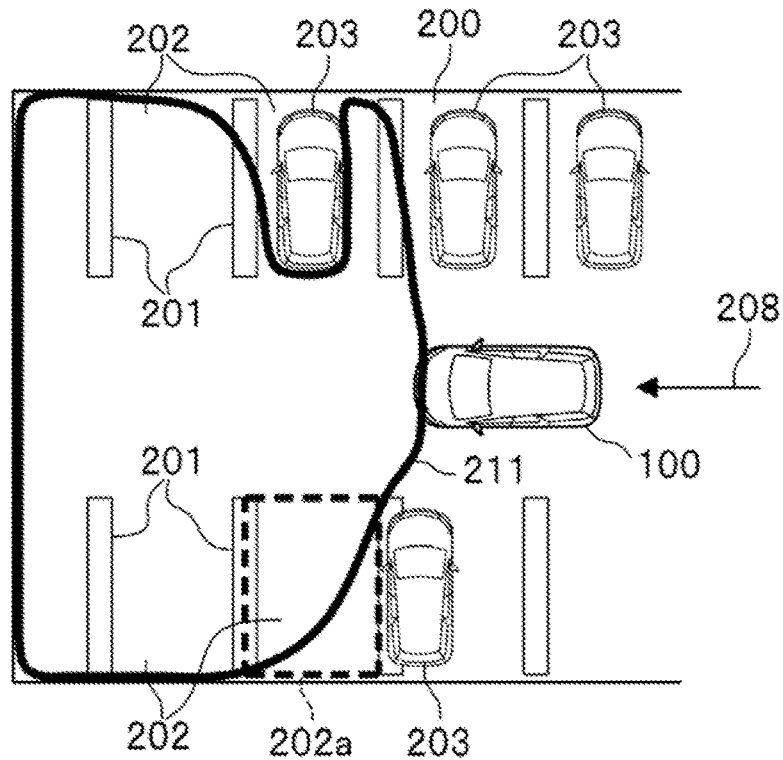
FIG. 4A is a top view of a parking area, to show the vehicle, mounted with the automated-parking control unit according to the embodiment of the present invention, in search of a space for parking.
Figure 4B:
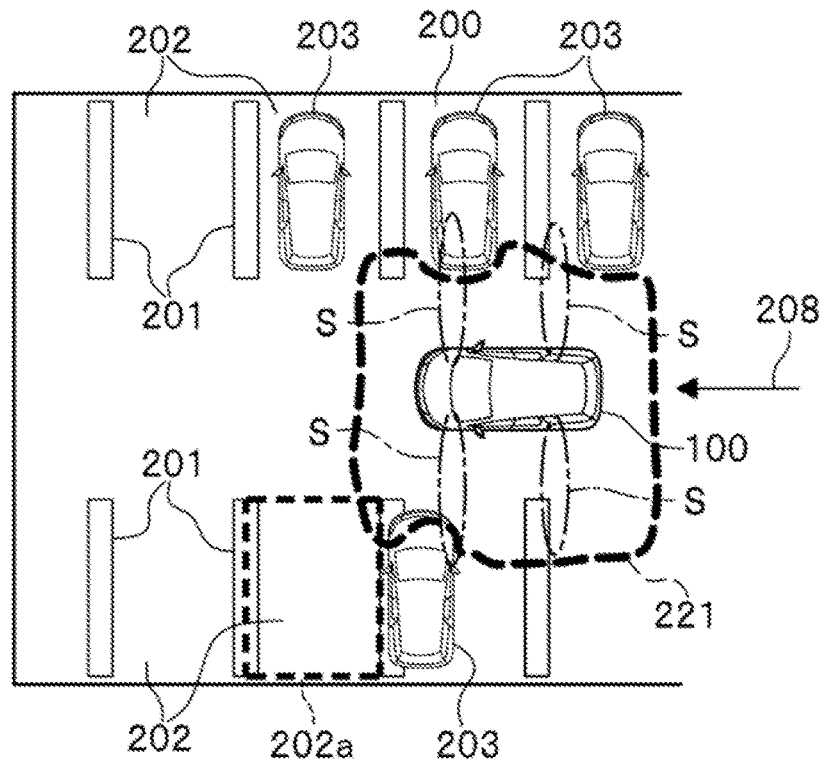
FIG. 4B is a top view of the parking area, to show the vehicle, mounted with the automated-parking control unit according to the embodiment of the present invention, in search of a space for parking.
Figure 4C:
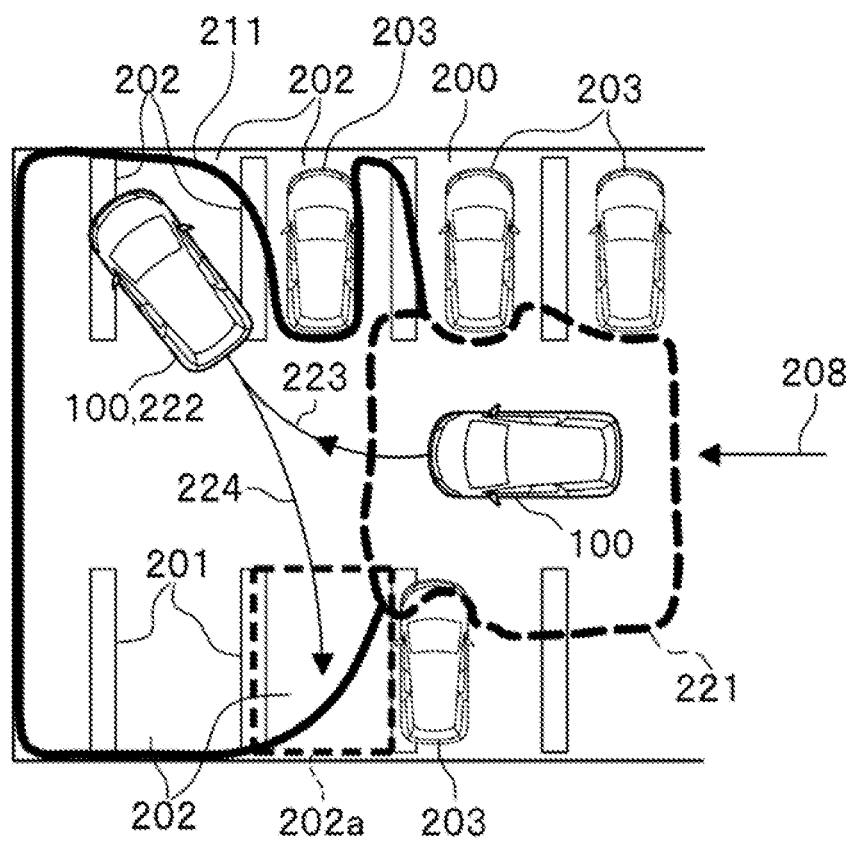
FIG. 4C is a top view of the parking area, to show the vehicle, mounted with the automated-parking control unit according to the embodiment of the present invention, in search of a space for parking.

Hereinbelow, a description is given of operation of systems centered around the automated-parking control unit 1. "Automated-parking operation" hereinbelow refers to a series of operation in a flowchart in FIGS. 5 and 6, to be described below, in which the automated-parking control unit 1 controls the systems, for automated driving, to drive the vehicle 100 to execute automated-parking. "Automated-parking function" refers to all the processing of automated-parking in the flowchart in FIGS. 5 and 6, inclusive of the "automated-parking operation" to be executed mainly by the automated-parking control unit 1. The automated-parking control unit 1 controls automated-parking. For this purpose, the camera group 21 and the sonar group 22 are used to detect a space for parking in a parking area or the like. FIGS. 4A to 4C each show the vehicle 100, in a top view, in search of a space for parking.

At first, FIG. 4A shows the vehicle 100, in a top view, in search of a space for parking in a parking area 200, mainly using the front camera 21F of the camera group 21. After the vehicle 100 entering the parking area 200, parking slots 202 segmented by white lines 201 are in a row respectively on the right and left sides as viewed from the vehicle 100, where some parking slots 202 have other vehicles 203 already parking and other parking slots 202 are available for parking. The vehicle 100 is driven by the driver to slowly move forward in a direction indicated by an arrow 208.

Images taken by the front camera 21F (see FIG. 2) allow for recognizing an area 211 as an available space for the vehicle 100 to park. The images taken by the front camera 21F are processed with predetermined image processing to allow for recognizing luminance differences. This allows the vehicle 100 to recognize the area 211 available for parking. Recognition by camera is good at recognizing, the white lines 201. Recognition by camera includes space recognition capability. Recognition by camera is not good at recognizing snow, white walls, and other nearby vehicles. Accordingly, only the images taken by the front camera 21F are not enough to control braking for obstacles, which is required for automated-parking.

Then, the sonar group 22 is used in combination. FIG. 4B is a top view of the parking area, to show the vehicle 100 in search of a space for parking in the parking area 200, using all sonars of the sonar group 22. A sonar can detect obstacles by transmitting and receiving sonic waves, and is good at detecting nearby obstacles, which a camera is not good at. Sonars are therefore required to accurately control braking for obstacles. Additionally, a sonar has a higher space recognition capability than a camera, so that the sonar group 22 is helpful to conduct various ways of parking. FIG. 4B shows an area 221 available for parking, recognized by the sonar group 22.

FIG. 4C is a top view of the parking area, with the area 211 and the area 221 collectively shown. The front camera 21F and the sonar group 22 are used in combination to recognize a wide space as being available for parking. This also eases controlling braking for obstacles. In the example in FIG. 4C, a parking slot 202a is determined to be a space for automated-parking. Additionally, a space on the far right, as viewed from the vehicle 100, is empty and thus determined as a position to start reverse steering of the vehicle 100. This allows the automated-parking control to move the vehicle 100 forward and turn the steering wheel to the right, suspend the vehicle 100 at the reverse steering position 222 (arrow 223), and reversely turn the steering wheel and move the vehicle 100 backward into the parking slot 202a (arrow 224).

Figure 5:
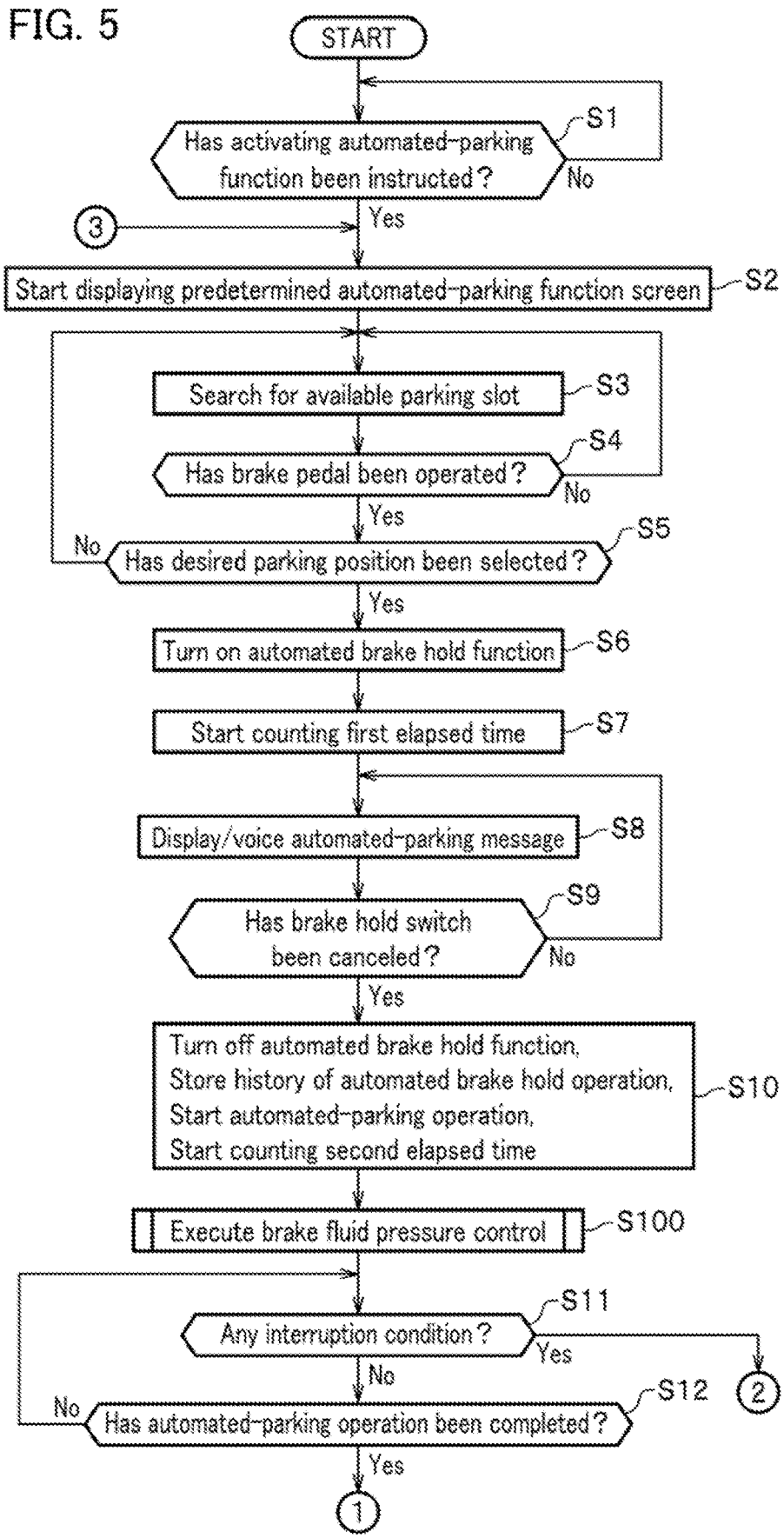
FIG. 5 shows a flowchart of a process executed by the automated-parking control unit according to the embodiment of the present invention.
Figure 6:
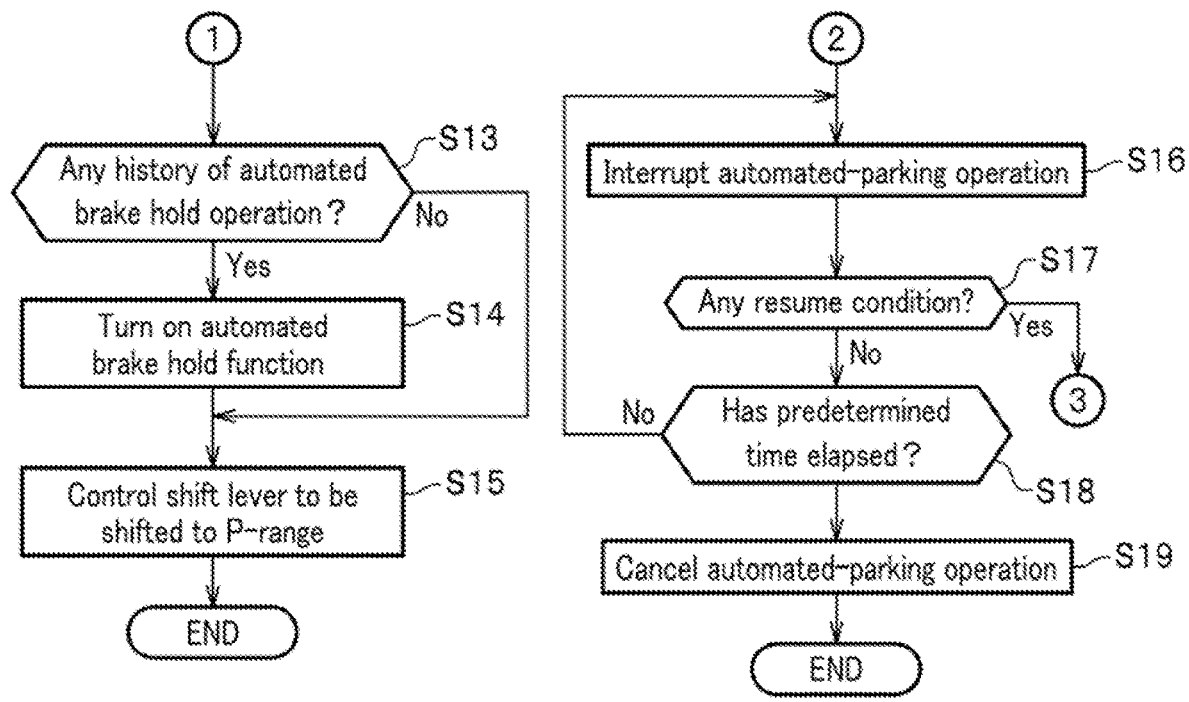
FIG. 6 shows a flowchart of a process executed by the automated-parking control unit according to the embodiment of the present invention.
Figure 7:
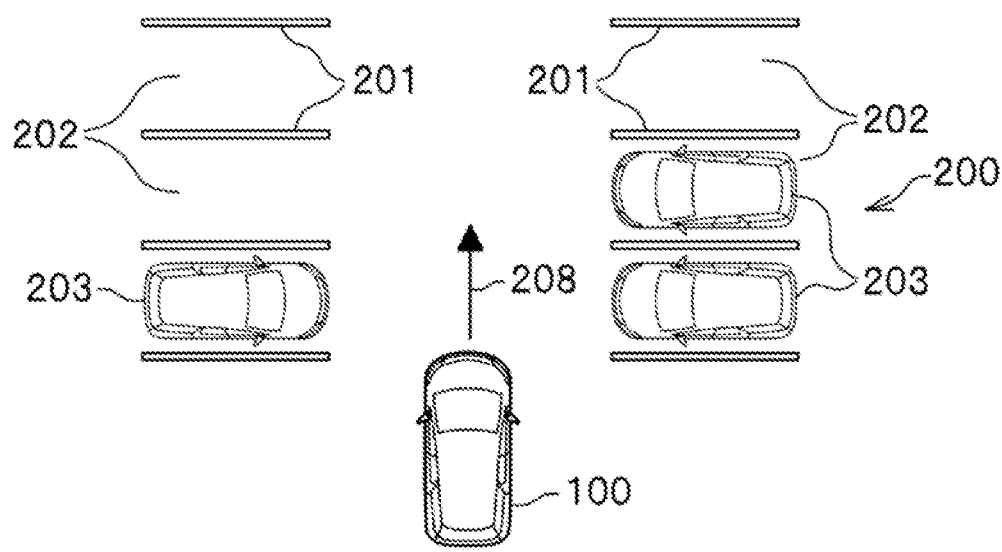
FIG. 7 is a top view of the parking area, to illustrate processing executed by the automated-parking control unit according to the embodiment of the present invention.
Figure 8:
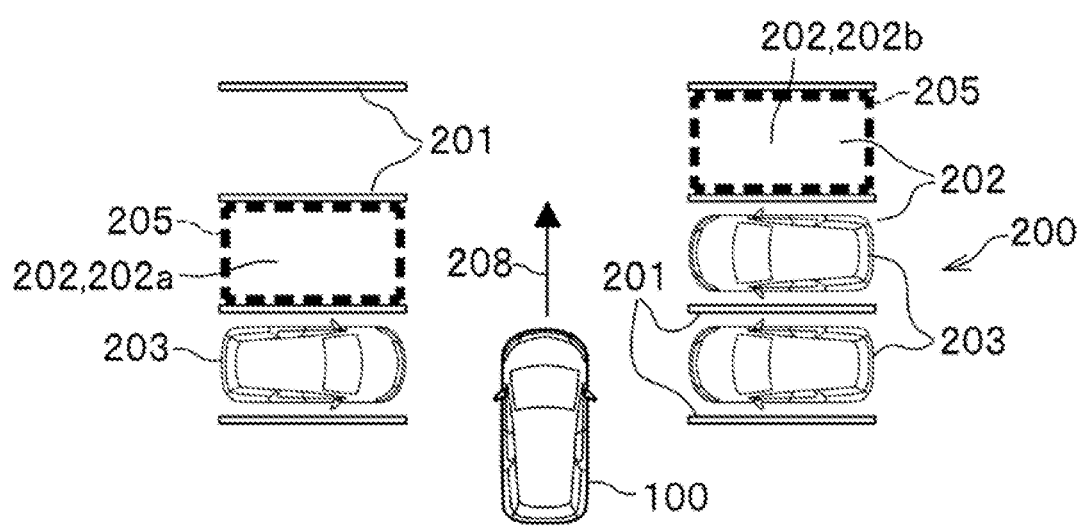
FIG. 8 is a top view of the parking area, to illustrate processing executed by the automated-parking control unit according to the embodiment of the present invention.
Figure 9:
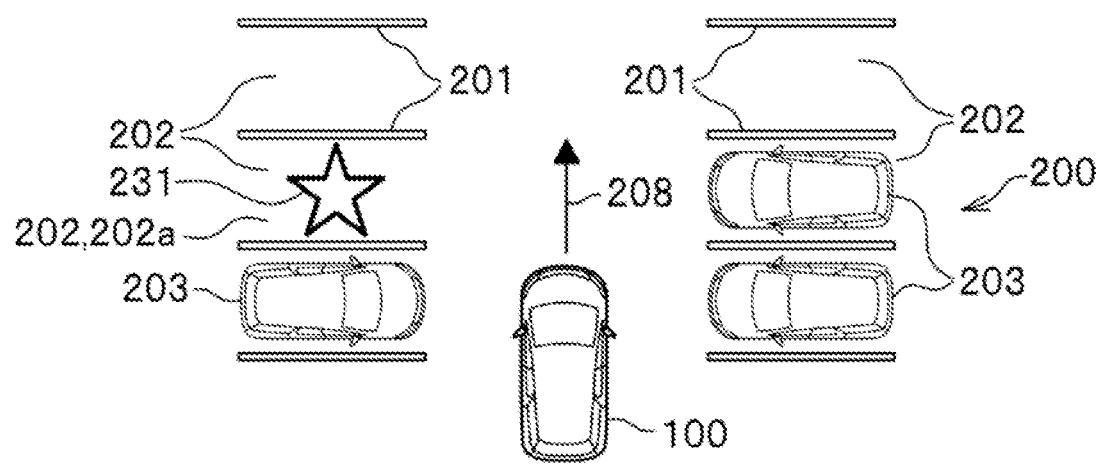
FIG. 9 is a top view of the parking area, to illustrate processing executed by the automated-parking control unit according to the embodiment of the present invention.

Hereinabove is a summary of automated-parking to use the front camera 21F and the sonar group 22 in combination, and a automated-parking process is described below in, detail. FIGS. 5 and 6 each show a flowchart of a process executed by the automated-parking control unit 1. FIGS. 7 to 10 are each a top view of the parking area, to illustrate processing executed by the automated-parking control unit 1. Note that the flowchart shows a summary of a series of processing to be described below, but does not show detailed processing executed by the automated-parking control unit 1. Processing not shown in the flowchart is described below as required.

First, the driver personally drives the vehicle 100 to enter the parking area 200, as indicated by the arrow 208. At this time, the driver operates the touch panel 32 or the like to instruct activating an automated-parking function (Yes in S1). The instruction of activating the automated-parking function is received by the parking activation instruction detector 12. Then, the parking activation instruction detector 12 displays a predetermined automated-parking function screen on the touch panel 32 (S2). Note that various kinds of automated-parking function screens are displayed, as required, in the series of processing. The available parking position detector 11a of the automated-parking controller 11 uses the front camera 21F and the sonar group 22 in combination, in a manner as described above with reference to FIGS. 4A to 4C. The available parking position detector 11a then searches for an available parking slot for parking, through the combined usage (S3).

Following processing is executed in S3 based on the searching result. First, the available parking position detector 11a detects available parking positions (the parking slots 202) for the vehicle 100. Parking slots 202a, 202b are candidates for desired parking positions in the example in FIG. 8. Additionally, the available parking position detector 11a calculates a route to avoid obstacles when the vehicle 100 parks in the parking slot 202a or 202b, based on the detection results by the front camera 21F and the sonar group 22.

Next, the desired parking position detector 11b estimates a current position of the vehicle 100, based on the detection results by the inertia sensor 23 and the wheel speed sensors 24. The desired parking position detector 11b then calculates a desired moving route of the vehicle 100 for parking in the parking slot 202a or 202b, based on the current position. The desired parking position detector 11b then displays positional relationships between the vehicle 100 (vehicle in question) and the parking slots 202a, 202b on the touch panel 32. The parking slots 202a, 202b are each indicated by a marking in the image, such as enclosing the slot with a frame 205, for easy understanding of the driver.

When the result has been "Yes" in S1, processing in S3 is executed (also when the result is No in S4), while the driver personally drives the vehicle 100 to move within the parking area 200. Then, when the driver steps on the brake pedal (not shown) (Yes in S4) to stop the vehicle 100, the desired parking position detector 11b executes the next processing. That is, with the driver operating the touch panel 32 to select a desired parking position (Yes in S5), the desired parking position detector 11b determines the selected position as the desired parking position. The selection may be made such as by touching an area indicated by the frame 205. When the selection has not been made (No in S5), the processing in S3 is continued. Note that the sequence of processing in S4 and S5 may be reversed. When the desired parking position is determined as described above (Yes in S5), the desired parking position detector 11b displays a marking 231, as in FIG. 9, within the image of the desired parking position (parking slot 202a in this case) on the touch panel 32.

Next, the brake hold instructor 13 instructs the automated brake hold control unit 44 to turn on an automated brake hold function (S6). The automated brake hold control unit 44 works as the automated brake hold controller. This allows for automatically retaining a state of the vehicle 100 being braked, even when the driver steps off the brake pedal (not shown).

The first parking operation interrupter 16 subsequently starts counting all elapsed time (first elapsed time) with a timer (S7). The automated-parking controller 11 displays an automated-parking message on the touch panel 32, and informs the driver of the automated-parking message by way of the speaker 33 (S8). In this case, the automated-parking message may only be displayed on the touch panel 32. Here, the message for the driver is given to the driver using an HMI (Human Machine Interface) internal notification message such as "please step off the brake pedal." The message can be one to the effect "Automated brake hold has been turned on. In order to make automated-parking start, please push the brake hold switch, hands off the steering wheel, and step off the brake pedal," for example.

Once the driver has executed all the actions instructed in the message, the brake hold switch 45 is pushed down to cancel the brake hold switch 45 (Yes in S9). In this case, pushing down the brake hold switch 45 can be interpreted as operation by a cancel instruction controller. When the brake hold switch 45 is not canceled (No in S9), the message described above is continuously displayed on the touch panel 32. Note that when predetermined operation is made in course of a series of processing (S2 to S8) as described above, the series of automated-parking processing is discontinued. The operation includes the driver operating the touch panel 32, on a screen of the automated-parking function displayed thereon, to discontinue operation of the automated-parking function and intentionally operating the shift lever 64.

When the brake hold switch 45 is canceled (Yes in S9), processing in S10 is executed. That is, the brake hold cancel instructor 15 instructs the automated brake hold control unit 44 to turn off the automated brake hold function (S10). This leads to canceling the vehicle 100 being braked. In addition, the brake hold continuation determiner 14 stores such a history that the automated brake hold function has been operated in S6 into a non-volatile memory or the like (S10). Further, the automated-parking controller 11 starts automated-parking operation (operation details are described below) (S10). Furthermore, the second parking operation interrupter 17 starts counting elapsed time (second elapsed time) with the timer (S10). Note that when there is no operation on the brake pedal (not shown), the automated-parking controller 11 executes following control. That is, the automated-parking controller 11 cancels the brake hold switch 45 (S9), but does not proceed to automated-parking operation (S10). However, even in this case, the automated brake hold function itself is kept ON (S6).

Figure 10:
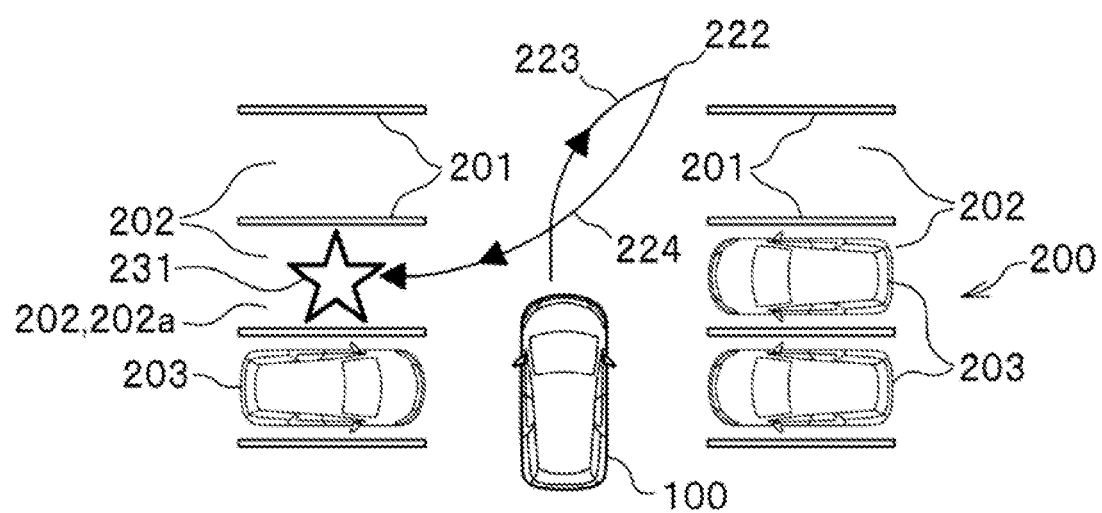
FIG. 10 is a top view of the parking area, to illustrate processing executed by the automated-parking control unit according to the embodiment of the present invention.

The automated-parking operation started by the automated-parking controller 11 is as follows. That is, the automated-parking controller 11 control the vehicle 100 so as to move on the desired moving route as determined in S3, as shown in FIG. 10. The automated-parking controller 11 controls the braking system 41, the driving system 51, the transmission system 61, and the EPS system 71. This causes the vehicle 100 to move backward to the parking slot 202a as the desired parking position.

That is, the automated-parking controller 11 controls these systems so that the vehicle 100 moves forward with the D-range as indicated by the arrow 223, and suspends at the reverse steering position 222. Next, the automated-parking controller 11 causes the vehicle 100 to move backward with the R-range into the parking slot 202a as the desired parking position, and then to stop.

Figure 12:
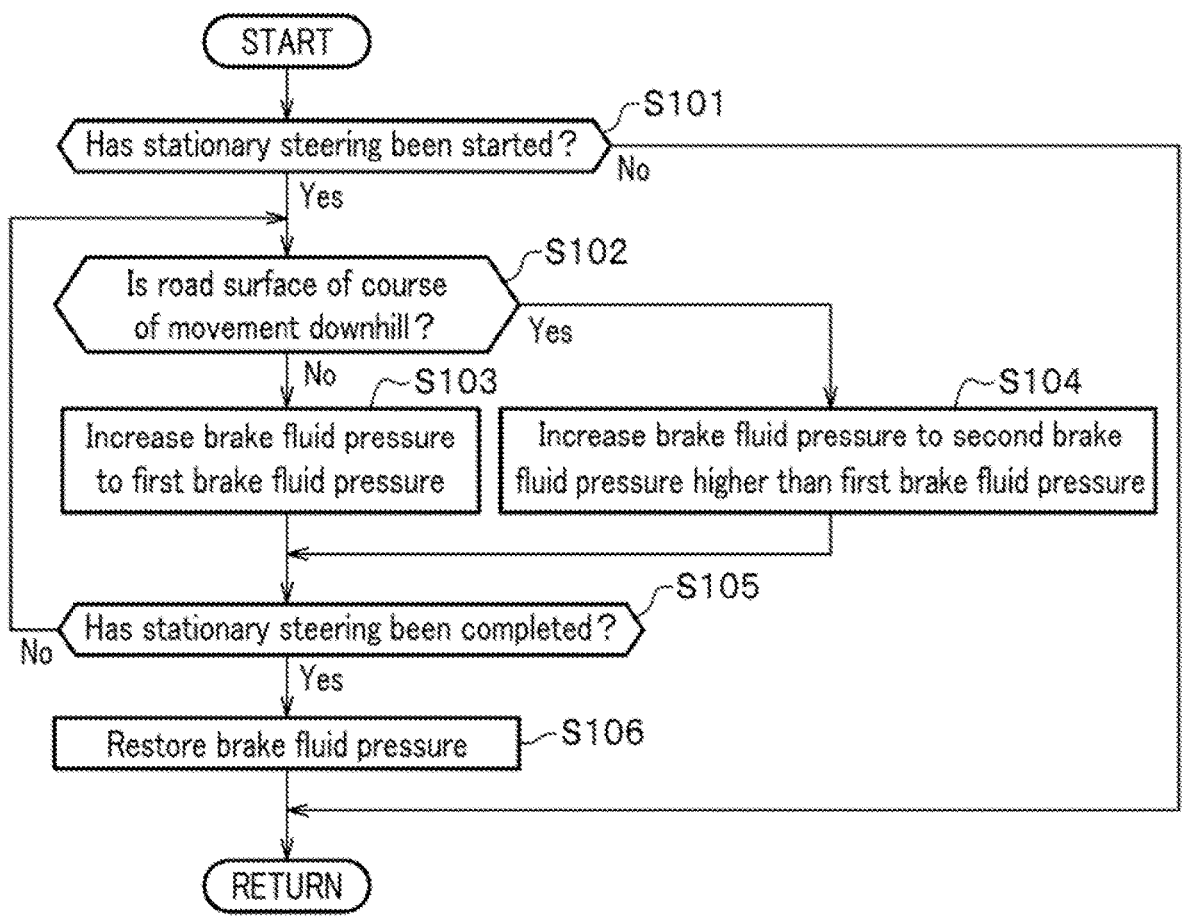
FIG. 12 is a flowchart of brake fluid pressure control, at stationary steering, by a brake fluid pressure controller of the automated-parking control unit according to the embodiment of the present invention.

In step S100, the brake fluid pressure controller 19 (see FIG. 1) executes brake fluid pressure control to increase the brake fluid pressure, while holding the vehicle 100 suspended, at the time of stationary steering (see FIG. 12 to be described below).

After the automated-parking operation has been started (S10), a determination is made whether or not there is any interruption condition to interrupt the automated-parking function while the automated-parking is in operation (S11). Namely, the interruption condition in S11 includes the steering wheel 72 being operated and the shift lever 64 being shifted to an N-range.

In addition, the first parking operation interrupter 16 determines in S11 whether or not the first elapsed time (the counting has been started in S7) is equal to or greater than a predetermined time. The first elapsed time is a time since the desired parking position has been decided (S5, S7) until operation of canceling the automated brake hold by way of the brake hold switch 45 is received (Yes in S9). The first elapsed time being equal to or greater than a predetermined time is also an interruption condition. Further, the second parking operation interrupter 17 determines in S11 whether or not the second elapsed time (the counting has been started in S10) is equal to or greater than a predetermined time. The second elapsed time is a time since the brake hold switch 45 has been operated (Yes in S9) until canceling operation on the brake pedal (not shown) is detected (Yes in S9). The second elapsed time being equal to or greater than a predetermined time is also an interruption condition.

The determination, by the driver presence determination unit 65, of a driver not being seated in a driver seat is also an interruption condition. The driver presence determination unit 65 is implemented with a seating sensor to detect whether or not the driver is seated in the driver seat, an in-vehicle camera to image interior of the vehicle (image processing allows for determining whether or not the driver is seated in the driver seat), a door opening sensor to detect whether or not a door for the driver seat is opened, or the like. Additionally, an interruption condition can be selected from various conditions to be considered to interrupt an automated-parking function. When the automated-parking operation has been completed without any interruption condition (Yes in S12), the touch panel 32, the speaker 33, and/or the like is/are used to inform that the automated-parking operation has been completed. Then, the processing proceeds to S13. When the automated-parking operation has been interrupted with some interruption condition (No in S12), the processing proceeds to S16.

In S13, the brake hold continuation determiner 14 determines whether a history of automated brake hold operation has been stored in S10. When such a history is stored (Yes in S13), the braking system 41 is controlled in S14 to turn on the automated brake hold function again, and the processing proceeds to S15. The vehicle 100 is thus braked to stop, although the driver does not step on the brake pedal (not shown). When such a history is not stored (No in S13), the processing proceeds to S15. In this case, the automated brake hold function is kept off. Following is the case where a history of automated brake hold operation has not been stored in S10. That is, even when the automated brake hold function is turned on in S6, the driver deliberately operates the brake hold switch 45 to turn off the function. In S15, the automated-parking controller 11 controls the shift lever 64 to be shifted to the P-range, and then the automated-parking ends.

In S16, some interruption condition exists (Yes in S11) and therefore the automated-parking function is interrupted. Then, a determination is made whether or not there is any condition for resuming the automated-parking function (S17). Such a resume condition includes a predetermined condition being fulfilled. The predetermined condition includes predetermined operation having been executed on a selection screen 81, shown in FIG. 11, as one of screens displayed on the touch panel 32 for the automated-parking function. The selection screen 81 shows a resume switch 82 and a cancel switch 83. The driver operating the resume switch 82 becomes a resume condition. When the cancel switch 83 is operated, canceling the automated-parking function is selected.

When there is a resume condition (Yes in S17), the processing returns to S2 and the automated-parking function is resumed. When there is no resume condition and a predetermined time has elapsed (No in S17, Yes in S18), canceling the automated-parking function is settled (S19), and a series of processing ends. When there is no resume condition and the predetermined time has not elapsed (No in S17, No in S18), the processing returns to S16. Note that when the cancel switch 83 is operated, the automated-parking function may be canceled without waiting for the predetermined time to elapse (Yes in S18).

Note that when there is some interruption condition (Yes in S11), fulfilling the resume condition (Yes in S17) allows for resuming the automated-parking function from S2. In contrast, when the cancel condition is fulfilled during a series of operation of automated-parking function, the processing itself in FIGS. 5 and 6 is canceled to have no resuming. When the processing needs to be resumed, the processing from S1 is newly executed. The cancel condition includes the shift lever 64 being shifted to the P-range, electric parking brake being operated, and the touch panel 32 or the like being operated to instruct activating the automated-parking function, during a series of operation of the automated-parking function. In addition, a series of operation of the automated-parking function is suspended when a suspension condition is fulfilled during a series of operation of the automated-parking function, but once the suspension condition is canceled in this case, the series of operation of the automated-parking function is resumed from the point where the operation has been suspended. The suspension condition includes the brake pedal (not shown) being operated.

Figure 11:
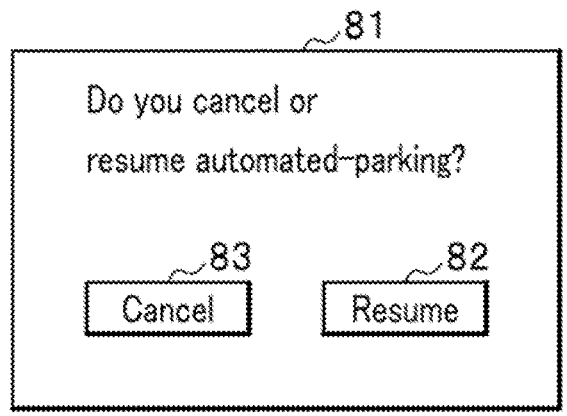
FIG. 11 is a plan view of a selection screen displayed on a touch panel through processing by the automated-parking control unit according to the embodiment of the present invention.

Further, there may be a case where the vehicle 100 is found to hinder another vehicle from moving ahead. The driver of the vehicle 100 then shifts the position of the shift level 64 from the D-range to the R-range. This cancels the automated-parking function and the selection screen 81 in FIG. 11 is displayed on the touch panel 32. Selecting the cancel switch 83 on this screen is followed by the driver personally driving the vehicle 100 to move backward for letting said another vehicle to go away. Then, the driver operates the touch panel 32 or the like again to instruct activating the automated-parking function for starting over automated-parking. When the resume switch 82 is operated, the automated-parking function resumes from S2.

The automated-parking control unit 1 described above executes following control after the automated-parking function has been activated (after Yes in S1) until parking operation to the desired parking position is started. That is, when the brake pedal (not shown) is operated (Yes in S4), the automated-parking control unit 1 turns on the automated brake hold function (S6). Accordingly, the braking force works even after the driver has stepped off the brake pedal (not shown), to prevent the vehicle 100 from unexpectedly moving.

The automated-parking control unit 1 requires following conditions in order to turn on the automated brake hold function (S6). That is, the conditions are that available parking slots have been detected (S3) and the driver has determined the desired parking position (Yes in S5). In other words, the automated-parking control unit 1 allows the driver to move the vehicle 100 before the driver determines a desired parking position. Also, the automated-parking control unit 1 allows for preventing the vehicle 100 from unnecessarily moving after the driver has determined the desired parking position (Yes in S5).

In addition, the automated-parking control unit 1 executes following control when the automated brake hold function has been turned on (S6) and the automated-parking operation has been completed (Yes in S12). That is, a history of activating the automated brake hold is recorded (S10, Yes in S13). The automated-parking control unit 1 thus turns on the automated brake hold function (S14) after the automated-parking operation has been completed (Yes in S12). That is, when having been started with automated brake hold, the automated-parking ends with automated brake hold. This prevents the vehicle 100 from unexpectedly moving after the automated-parking operation has been completed (Yes in S12). In contrast, even when the automated brake hold function has been turned on (S6), the driver may operate the brake hold switch 45 to turn off the automated brake hold function. In this case, the automated brake hold function is kept off (No in S13) after the automated-parking operation has been completed (Yes in S12), as intended by the driver.

Further, when the brake hold switch 45 is canceled (Yes in S9) while the driver is operating the brake pedal (not shown) (S4), control is executed as follows. That is, the automated-parking control unit 1 turns off the automated brake hold function in this case to cancel braking (S10), and starts automated-parking operation (S10). Accordingly, from a state of the driver operating the brake pedal (S4), braking is canceled and then the automated-parking operation is started (S10), to give a secure feeling to the driver.

Still further, the automated-parking control unit 1 makes operation of the shift lever 64, the steering wheel 72, or the brake pedal (not shown) as an interruption condition (S11). When the interruption condition is fulfilled, the automated-parking control unit 1 interrupts the automated-parking operation (S16). This allows for giving higher priority to the driver's intention to interrupt the automated-parking operation than to continuing the operation.

Still further, the first elapsed time or second elapsed time being equal to or greater than a predetermined time is also an interruption condition (S11). The first elapsed time is a time since the desired parking position has been decided (Yes in S5, S7) until the brake hold switch 45 is operated (Yes in S9). The second elapsed time is a time since the brake hold switch 45 has been operated (Yes in S9) until operation on the brake pedal (not shown) is canceled (S10). When the first elapsed time or second elapsed time is equal to or greater than the predetermined time, it is likely to happen that other vehicles 203 move in and/or out of the parking slots 202. In other words, this allows for preventing automated-parking operation from being executed in a situation possibly different from that when the available parking slots have been searched for (S3).

Still further, when automated-parking is interrupted (S16), the resume conditions are defined (S17). The resume conditions include the brake hold switch 45 being operated and a predetermined condition being fulfilled. The predetermined condition includes the resume switch 82 being operated in the selection screen 81, as one of screens displayed on the touch panel 32 for the automated-parking function. The automated-parking control unit 1 is thus capable of resuming the automated-parking function not only with operation of the brake hold switch 45 but also with operation of the resume switch 82 or the like.

<Brake Fluid Pressure Control Operation at Stationary Steering>

Figure 13:
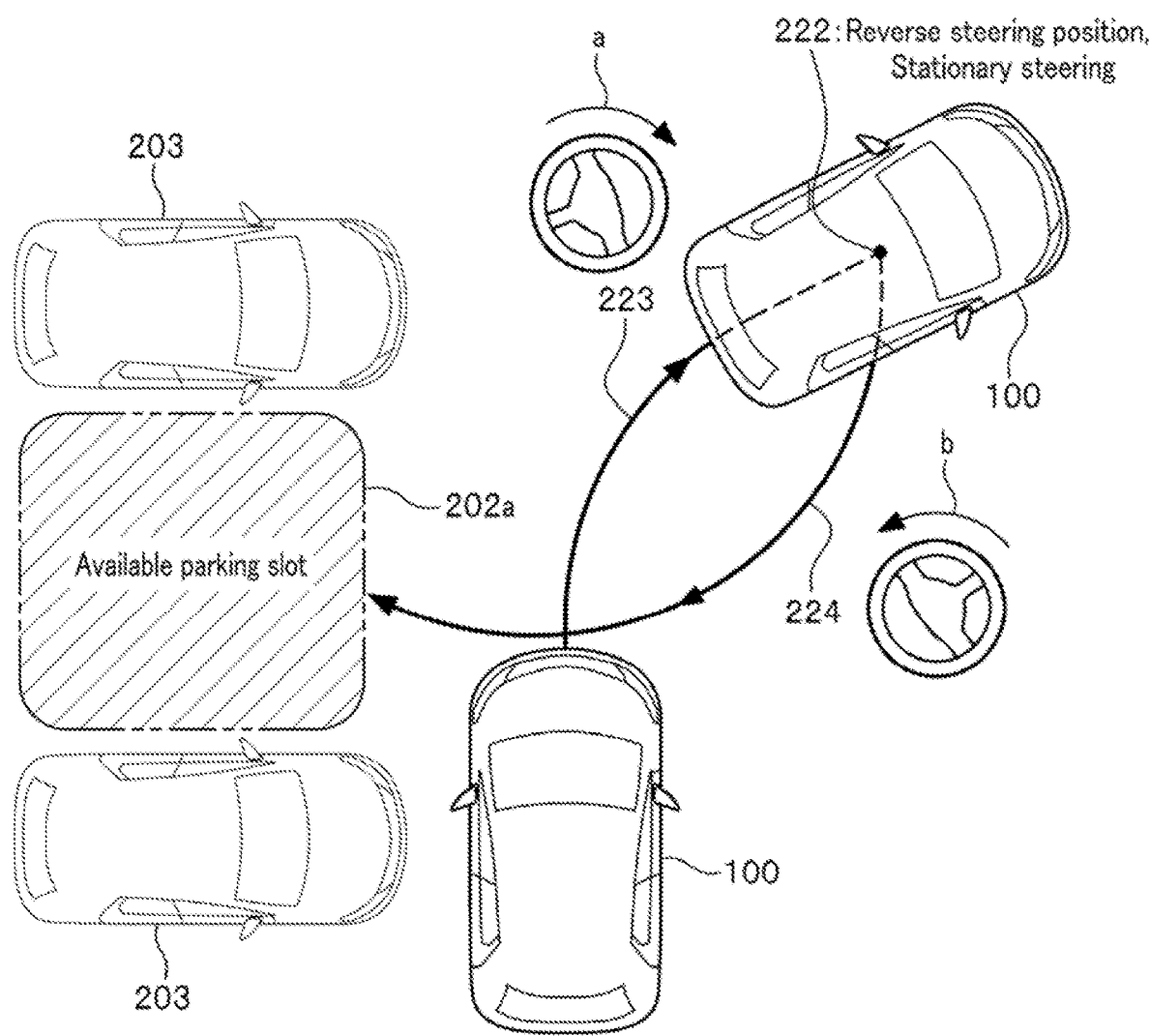
FIG. 13 is a top view of the parking area, to illustrate the brake fluid pressure control, at stationary steering, by the brake fluid pressure controller of the automated-parking control unit according to the embodiment of the present invention.

Next, a description is given of brake fluid pressure control by the brake fluid pressure controller 19. FIG. 12 is a flowchart of brake fluid pressure control, at stationary steering, by the brake fluid pressure controller 19. FIG. 12 shows a subroutine of the process in FIGS. 5 and 6, indicated as step S100. FIG. 13 is a top view of the parking area, to illustrate the brake fluid pressure control by the brake fluid pressure controller 19.

The automated-parking controller 11 (see FIG. 1) of the automated-parking control unit 1 controls the above-described system to cause the vehicle 100 to turn right with automated steering (see arrow "a" in FIG. 13) so as to move forward with the D-range, as indicated by the arrow 223 in FIG. 13, and then suspend at the reverse steering position 222. The controller then causes the vehicle 100 to execute stationary steering (steering while the vehicle being in suspension) after the suspension at the reverse steering position 222 (while the brake hold being in operation), as shown in FIG. 13. Next, the automated-parking controller 11 causes the vehicle 100 to turn left with automated steering (see arrow "b" in FIG. 13) so as to move backward with the R-range, as indicated by the arrow 224 in FIG. 13, into the available parking slot 202*a* as the desired parking position, and then to stop.

After a subroutine call in step 100 in FIG. 5, the automated-parking control unit 1 determines in S101 whether or not stationary steering has been started. That is, a determination is made for a timing of stationary steering after suspension at the predetermined position (while the brake hold being in operation) in the series of operation of the automated-parking function. When stationary steering has not been started (No in S101), the processing returns to step S100 in FIG. 5. When stationary steering has been started (Yes in S101), the automated-parking control unit 1 determines in S102 whether a road surface of a course of movement is downhill or not, based on output of the gradient sensor 26. Note that the vehicle 100 easily moves on an uphill or downhill road, as compared with a case on a flat road, to have no need to consider a longitudinal orientation of the vehicle 100 such that a front vehicle portion is on a downhill side or a rear vehicle portion is on a downhill side. When the road surface of the course of movement is not downhill (No in S102), the brake fluid pressure controller 19 in S103 increases a brake fluid pressure, which has been constant, to a first brake fluid pressure and then proceeds to S105.

When the road surface of the course of movement is downhill (Yes in S102), the brake fluid pressure controller 19 in S104 increases a brake fluid pressure to a second brake fluid pressure, which is higher than the first brake fluid pressure, and then proceeds to S105. Here, desired brake fluid pressures as the first and second brake fluid pressures may be based on brand-new brake pads (the first and second brake pads 311, 312 in FIG. 3)

The automated-parking control unit 1 determines in S105 whether or not the stationary steering has been completed. When the stationary steering has not been completed (No in S105), the processing returns to S102 as described above. When the stationary steering has been completed (Yes in S105), the brake fluid pressure controller 19 in S106 restores the brake fluid pressure increased to the first or second brake fluid pressure, i.e., the original, constant (predetermined) brake fluid pressure, and then the processing returns to S100 of the flowchart in FIG. 5.

As described above, the automated-parking control unit 1 (parking assist system) of the present embodiment for the vehicle 100 (see FIG. 1) includes: the environment recognizer 1*a* to recognize environment of the vehicle 100; the behavior controller 1*b* to execute behavior control inclusive of steering and acceleration/deceleration, based on recognized information; the brake hold instructor 13 (suspension hold controller) to suspend the vehicle 100 with the behavior control and hold the vehicle suspended until receiving behavior-related operation by a driver; the automated-parking controller 11 to set the reverse steering position 222 (see FIGS. 10 and 13), based on a current position of the vehicle 100 and a desired parking position decided by the driver, between the current position and the desired parking position, move from the current position to the reverse steering position 222, and execute stationary steering at the reverse steering position 222; and the brake fluid pressure controller 19 to increase a braking force of the vehicle 100 (increase a brake fluid pressure, for example) when stationary steering is executed at the reverse steering position 222.

With this configuration, a brake fluid pressure of the vehicle in question is increased when stationary steering is executed at the reverse steering position for parking, to strongly press the brake pads 311, 312 against the disk 320 to prevent the brake pads 311, 312 from making a brake noise. Uncomfortable feeling or discomfort due to a brake noise at stationary steering is prevented during automated steering by the parking assist system.

Incidentally, Patent Document 1 discloses braking force control to decrease a brake fluid pressure at the time of stationary steering and, when a driver intends to personally brake while braking force control being in operation, increases the brake fluid pressure to the original brake fluid pressure. Patent Document 1 is not for preventing a brake noise from being made at stationary steering during automated steering by a parking assist system.

In contrast, the present embodiment increases the brake fluid pressure of the vehicle 100 at the reverse steering position 222, at the time of stationary steering while the automated-parking control being in operation, and this control is opposite to the technique used by Patent Document 1. The present embodiment prevents a brake noise at stationary steering while automated steering being in operation, even with some burden to a steering device, to have advantageous effects of keeping quietness within the compartment, eliminating uncomfortable feeling or discomfort due to a brake noise, and enhancing product appeal.

Here, the vehicle 100 is one having a driving source disposed on an opposite side in a vehicle front-rear direction to the steering wheel, such as a rear-wheel drive vehicle. Such a vehicle has a smaller load applied to the steering wheel at the time of stationary steering, as compared with a vehicle having a driving source disposed on the same side in the vehicle front-rear direction as the steering wheel, to have a load to the steering device mitigated while the present control being in operation. That is, the vehicle 100 is desirably a vehicle having a driving source disposed on an opposite side in the vehicle front-rear direction to the steering wheel.

The automated-parking controller 11 of the present embodiment shifts the position in the shift range of the transmission mounted on the vehicle 100 from the D-range to the R-range at the reverse steering position 222, based on the shift position data from the shift position sensor 25. In this manner, the vehicle 100 is moved forward as indicated by the arrow 223, is suspended at the reverse steering position 222, and is moved backward as indicated by the arrow 224 into the parking slot 202a for parking, as shown in FIG. 13.

When braking operation is canceled by the driver, the automated-parking controller 11 of the present embodiment starts moving the vehicle toward the desired parking position. Before the driver determines a desired parking position, the controller allows the vehicle 100 to be driven and moved by the driver. After the driver has determined the desired parking position (Yes in S5), the controller inhibits the vehicle 100 from being unnecessarily moved.

The brake fluid pressure controller 19 of the present embodiment executes brake fluid pressure control to increase a brake fluid pressure from a predetermined pressure to a desired brake fluid pressure, and the desired brake fluid pressure is varied depending on a steering speed and/or a steering angle at the stationary steering. As the desired brake fluid pressure is varied depending on a steering speed and/or a steering angle at the stationary steering, a brake noise is prevented while a braking force is exerted according to a condition of stationary steering.

With the present embodiment, the vehicle 100 is provided with the gradient sensor 26 to detect a gradient of a road surface on which the vehicle 100 is located, and the brake fluid pressure controller 19 varies a brake fluid pressure, based on a gradient of a course of movement detected by the gradient sensor 26. For example, when the gradient is of a downhill or an uphill, the brake fluid pressure controller 19 increases the brake fluid pressure. As the brake fluid pressure is varied based on a gradient of a course of movement in this manner, a brake noise is prevented while a braking force is exerted according to a gradient of a course of movement.

The vehicle 100 (see FIG. 1) is provided with a disk brake 300 to press brake pads 311, 312 (see FIG. 3) against a disk 320 by way of oil pressure to brake the vehicle 100, and the brake fluid pressure controller 19 of the present embodiment executes brake fluid pressure control to increase a brake fluid pressure from a constant pressure (predetermined pressure) to the desired brake fluid pressure. The desired brake fluid pressure is set to one with the brand-new brake pads as standards. That is, a brand-new brake pad includes a friction material having a larger thickness to easily make a brake noise. Once the desired brake fluid pressure is set to be used for increasing a brake fluid pressure with the brand-new brake pad as standards, a brake noise would be less likely made with a decreasing thickness of the friction material due to aging, to allow for preventing a brake noise regardless of aging of the disk brake 300.

Modifications

As shown in FIG. 13, the present embodiment causes the vehicle 100 to move forward with the D-range, suspend at the reverse steering position 222, execute stationary steering after the suspension at the reverse steering position 222 (while the brake hold being in operation), move backward with the R-range into the desired parking position, and stop. As a modification, the desired brake fluid pressure may be varied depending on a steering speed and/or a steering angle at the stationary steering to vary an increasing amount of the brake fluid pressure. Specifically, when a steering speed is small or a steering angle is small, the desired brake fluid pressure is less increased. When configured to vary the desired brake fluid pressure depending on a steering speed and/or a steering angle at the stationary steering, as described above, the device would prevent a brake noise more effectively while a load to the steering device being reduced.

The embodiment hereinabove has been described for the purpose of illustrating the present invention in detail, and the present invention is not limited to one having all the components as described above. Parking assist is only required to increase a brake fluid pressure, and can be used not only for moving in but also for moving out. In addition, a case has been described above in which automated parking operation involves moving the vehicle 100 backward into the parking slot, but it may involve moving the vehicle 100 forward into the parking slot. Alternatively, the driver may be allowed to select between moving backward or moving forward.

LIST OF REFERENCE SIGNS

1: automated-parking control unit (parking assist system), 1a: environment recognizer, 1b: behavior controller, 11: automated-parking controller (suspension hold controller), 11a: available parking position detector, 11b: desired parking position detector, 12: parking activation instruction detector, 13: brake hold instructor (suspension hold controller), 14: brake hold continuation determiner, 15: brake hold cancel instructor, 16: first parking operation interrupter, 17: second parking operation interrupter, 18: resume instructor, 19: brake fluid pressure controller, 25: shift position sensor, 26: gradient sensor (road surface gradient detector), 44: automated brake hold control unit (automated brake hold controller), 45: brake hold switch (cancel instruction controller), 64: shift lever, 72: steering wheel, 82: resume switch (resume instruction receiver), 100: vehicle, 202a: desired parking slot, 222: reverse steering position, 300: disk brake, 311: first brake pad, and 312: second brake pad.

What is claimed is:

1. A parking assist system comprising a processor configured to execute functions of:
an environment recognizer to recognize environment of a vehicle;
a behavior controller to execute behavior control inclusive of steering and acceleration/deceleration, based on recognized information;
a suspension hold controller to suspend the vehicle with the behavior control and hold the vehicle suspended until receiving behavior-related operation by a driver;
an automated-parking controller to set a reverse steering position, based on a current position of the vehicle and a desired parking position decided by the driver, between the current position and the desired parking position, move the vehicle from the current position to the reverse steering position, and execute stationary steering, which is steering while the vehicle is in suspension, at the reverse steering position; and
a brake fluid pressure controller to increase a braking force of the vehicle when stationary steering is executed at the reverse steering position, wherein the brake fluid pressure controller executes brake fluid pressure control to increase a brake fluid pressure from a predetermined pressure to a desired brake fluid pressure, the desired brake fluid pressure is varied depending on a steering speed and/or a steering angle during the stationary steering, the brake fluid pressure controller increases the fluid pressure when a gradient is of a downhill or an uphill, the vehicle is provided with a disk brake to press brake pads against a disk by way of fluid pressure to brake the vehicle, the brake fluid pressure controller executes brake fluid pressure control to increase the brake fluid pressure from a predetermined pressure to a desired brake fluid pressure, and the desired brake fluid pressure is set to one with brand-new brake pads.

2. The parking assist system as claimed in claim 1, wherein
the automated-parking controller shifts a position in a shift range of a transmission mounted on the vehicle from a 0-range to an R-range at the reverse steering position.

3. The parking assist system as claimed in claim 1, wherein the processor is further configured to execute a function of:
a road surface gradient detector to detect a gradient of a road surface on which the vehicle is located, and
the brake fluid pressure controller varies the brake fluid pressure, based on the gradient of a course of movement.

4. A vehicle with automated parking capability, the vehicle comprising a processor configured to execute function of:
an environment recognizer to recognize environment of a vehicle;
a behavior controller to execute behavior control inclusive of steering and acceleration/deceleration, based on recognized information;
a suspension hold controller to suspend the vehicle with the behavior control and hold the vehicle suspended until receiving behavior-related operation by a driver;
an automated-parking controller to set a reverse steering position, based on a current position of the vehicle and a desired parking position decided by the driver, between the current position and the desired parking position, move the vehicle from the current position to the reverse steering position, and execute stationary steering, which is steering while the vehicle is in suspension, at the reverse steering position; and
a brake fluid pressure controller to increase a braking force of the vehicle when stationary steering is executed at the reverse steering position
wherein the brake fluid pressure controller executes brake fluid pressure control to increase a brake fluid pressure from a predetermined pressure to a desired brake fluid pressure, the desired brake fluid pressure is varied depending on a steering speed and/or a steering angle during the stationary steering, the brake fluid pressure controller increases the fluid pressure when a gradient is of a downhill or an uphill, the vehicle is provided with a disk brake to press brake pads against a disk by way of fluid pressure to brake the vehicle, the brake fluid pressure controller executes brake fluid pressure control to increase the brake fluid pressure from a predetermined pressure to a desired brake fluid pressure, and the desired brake fluid pressure is set to one with brand-new brake pads.

5. The vehicle with automated parking capability as claimed in claim 4, wherein the vehicle is one having a driving source disposed on an opposite side in a vehicle front-rear direction to a steering wheel.

6. A parking assist method for a parking assist system, the method comprising:
an environment recognition step of recognizing environment of a vehicle;
a behavior control step of executing behavior control inclusive of steering and acceleration/deceleration, based on recognized information;
a suspension hold control step of suspending the vehicle with the behavior control and holding the vehicle suspended until receiving behavior related operation by a driver;
an automated-parking control step of setting a reverse steering position, based on a current position of the vehicle and a desired parking position decided by the driver, between the current position and the desired parking position, moving the vehicle from the current position to the reverse steering position, and executing stationary steering, which is steering while the vehicle is in suspension, at the reverse steering position; and
a brake fluid pressure control step of increasing a braking force of the vehicle when stationary steering is executed at the reverse steering position,
wherein the brake fluid pressure controller executes brake fluid pressure control to increase a brake fluid pressure from a predetermined pressure to a desired brake fluid pressure, the desired brake fluid pressure is varied depending on a steering speed and/or a steering angle during the stationary steering, the brake fluid pressure controller increases the fluid pressure when a gradient is of a downhill or an uphill, the vehicle is provided with a disk brake to press brake pads against a disk by way of fluid pressure to brake the vehicle, the brake fluid pressure controller executes brake fluid pressure control to increase the brake fluid pressure from a predetermined pressure to a desired brake fluid pressure, and the desired brake fluid pressure is set to one with brand-new brake pads.

* * * * *